(12) United States Patent
Vijayasankar et al.

(10) Patent No.: US 9,742,785 B2
(45) Date of Patent: *Aug. 22, 2017

(54) POWER LINE COMMUNICATION (PLC) NETWORK NODES USING CIPHER THEN SEGMENT SECURITY

(71) Applicant: TEXAS INSTRUMENTS INCORPORATED, Dallas, TX (US)

(72) Inventors: Kumaran Vijayasankar, Allen, TX (US); Ramanuja Vedantham, Allen, TX (US); Tarkesh Pande, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/216,291

(22) Filed: Jul. 21, 2016

(65) Prior Publication Data

US 2016/0330213 A1    Nov. 10, 2016

Related U.S. Application Data

(60) Division of application No. 14/826,342, filed on Aug. 14, 2015, now Pat. No. 9,425,955, which is a continuation of application No. 14/045,960, filed on Oct. 4, 2013, now Pat. No. 9,143,327.

(51) Int. Cl.
| | |
|---|---|
| *H04L 29/06* | (2006.01) |
| *H04L 9/30* | (2006.01) |
| *H04B 3/54* | (2006.01) |
| *G06F 15/177* | (2006.01) |

(Continued)

(52) U.S. Cl.
CPC .......... *H04L 63/123* (2013.01); *G06F 15/177* (2013.01); *H04B 3/54* (2013.01); *H04B 3/542* (2013.01); *H04L 9/0819* (2013.01); *H04L 9/30* (2013.01); *H04L 9/3242* (2013.01); *H04L 63/0428* (2013.01); *H04L 63/061* (2013.01);
(Continued)

(58) Field of Classification Search
CPC .......................... H04L 63/0428; H04L 63/123
See application file for complete search history.

(56) References Cited

U.S. PATENT DOCUMENTS

| | | |
|---|---|---|
| 7,353,388 B1 | 4/2008 | Gilman et al. |
| 2002/0083317 A1 | 6/2002 | Ohta et al. |
| 2004/0037407 A1 | 2/2004 | Gourraud et al. |

(Continued)

*Primary Examiner* — Dao Ho
(74) *Attorney, Agent, or Firm* — Rose Alyssa Keagy; Charles A. Brill; Frank D. Cimino (57) ABSTRACT

Embodiments of the invention provide systems and methods for a cipher then segment approach in a Power Line Communication (PLC). A node or device generates frames to be transmitted to a destination node in the PLC network. A processor in the node is configured to generate a data payload comprising data to be sent to the destination node. The processor divides the data payload into two or more payload segments and encrypts the payload segments. The processor creates a frame for each of the encrypted payload segments, wherein each frame comprises a message integrity code. The processor creates a segment identifier for each frame using the message integrity code and an authentication key that is shared with the destination PLC node. The segment identifier is added to each frame.

10 Claims, 6 Drawing Sheets

(51) Int. Cl.
*H04L 9/32* (2006.01)
*H04L 9/08* (2006.01)

(52) U.S. Cl.
CPC .. *H04L 63/0876* (2013.01); *H04B 2203/5408* (2013.01); *H04L 2209/24* (2013.01)

(56) References Cited

U.S. PATENT DOCUMENTS

| | | |
|---|---|---|
| 2004/0111610 A1 | 6/2004 | Slick et al. |
| 2004/0193891 A1 | 9/2004 | Ollila |
| 2005/0091413 A1 | 4/2005 | Walbeck et al. |
| 2005/0111451 A1 | 5/2005 | Kim |
| 2006/0212928 A1 | 9/2006 | Maino et al. |
| 2007/0297451 A1 | 12/2007 | Kim et al. |
| 2008/0301747 A1 | 12/2008 | Yan et al. |
| 2010/0265940 A1 | 10/2010 | Tenenti et al. |
| 2011/0041046 A1 | 2/2011 | Kang et al. |
| 2011/0167273 A1 | 7/2011 | Maas et al. |
| 2011/0285570 A1* | 11/2011 | Shirai .................... G08C 17/02 341/176 |
| 2014/0281530 A1 | 9/2014 | Song et al. |
| 2015/0098569 A1 | 4/2015 | Vijayasankar et al. |

* cited by examiner

POWER LINE COMMUNICATION (PLC) NETWORK NODES USING CIPHER THEN SEGMENT SECURITY

CROSS REFERENCE TO RELATED APPLICATIONS

This application is a Divisional of and claims priority to U.S. patent application Ser. No. 14/826,342, filed on Aug. 14, 2015, which is a Continuation of and claims the benefit of U.S. patent application Ser. No. 14/045,960, filed Oct. 4, 2013, now U.S. Pat. No. 9,143,327, grant date Sep. 22, 2015.

BACKGROUND

Power line communications (PLC) include systems for communicating data over the same medium that is also used to transmit electric power to residences, buildings, and other premises, such as wires, power lines, or other conductors. In its simplest terms, PLC modulates communication signals over existing power lines. This enables devices to be networked without introducing any new wires or cables. This capability is extremely attractive across a diverse range of applications that can leverage greater intelligence and efficiency through networking. PLC applications include utility meters, home area networks, and appliance and lighting control.

PLC is a generic term for any technology that uses power lines as a communications channel. Various PLC standardization efforts are currently in work around the world. The different standards focus on different performance factors and issues relating to particular applications and operating environments. Two of the most well-known PLC standards are G3 and PRIME. G3 has been approved by the International Telecommunication Union (ITU). IEEE is developing the IEEE P1901.2 standard that is based on G3. Each PLC standard has its own unique characteristics.

The manner in which PLC systems are implemented depends upon local regulations, characteristics of local power grids, etc. The frequency band available for PLC users depends upon the location of the system. In Europe, PLC bands are defined by the CENELEC (European Committee for Electrotechnical Standardization). The CENELEC-A band (3 kHz-95 kHz) is exclusively for energy providers. The CENELEC-E, C, D bands are open for end user applications, which may include PLC users. Typically, PLC systems operate between 35-90 kHz in the CENELEC A band using 35 tones spaced 13675 kHz apart. In the United States, the FCC has conducted emissions requirements that start at 535 kHz and therefore the PLC systems have an FCC band defined from 154-487.5 kHz using 72 tones spaced at 4.6875 kHz apart. In other parts of the world different frequency bands are used, such as the Association of Radio Industries and Businesses (ARID)-defined hand in Japan, which operates at 10-450 kHz, and the Electric Power Research Institute (EPRI) defined bands in China, which operates at 3-90 kHz.

Segmentation is used for the transmission of large frames when the physical Maximum Transmission Unit (MTU) size in a system does not permit transfer of the entire frame. In some standards, such as IEEE P1901.2 and G3, segmentation is performed at the MAC layer. The MAC layer on the transmitter side segments an incoming frame if it is larger than a particular size, At the receiver side, the MAC layer performs a reassembly procedure.

The MAC layer is also responsible for performing encryption to provide security. Such encryption may be performed before or after segmentation. If encryption is performed before segmentation, then there is a potential security threat because the MAC header (MHR) is unencrypted. A receiver in this situation cannot determine a fake packet until the reassembly is completed. On the other hand, if encryption is performed after segmentation, it can lead to additional overhead due to presence of a message integrity check field (MIC) and the security padding that is necessary for encryption mechanisms typically used in PLC networks.

SUMMARY OF THE INVENTION

In one embodiment, systems and methods for transmitting encrypted packets in a power line communication (PLC) network are disclosed.

A PLC node or device generates frames to be transmitted to a destination node in the PLC network. A processor in the node is configured to generate a data payload comprising data to be sent to the destination node. The processor divides the data payload into two or more payload segments and encrypts the payload segments. The processor creates a frame for each of the encrypted payload segments, wherein each frame comprises a message integrity code. The processor creates a segment identifier for each frame using the message integrity code and an authentication key that is shared with the destination PLC node. The segment identifier is added to each frame.

A transmitter in the node is configured to transmit the frames with segment identifiers to the destination PLC node. The segment identifier may be created using an MD5 algorithm. The authentication key and the message integrity code may be combined to create an input value. The MD5 algorithm generates an output value from the input value. The segment identifier may be created from the MD5 output value.

In one embodiment, the authentication key may be a 128-bit key, the message integrity code may be a 16-bit cyclic redundancy check (CRC) value, and the first 16-bits of the output value may be used to create the segment identifier.

The PLC node or device may also receive frames from other nodes in the PLC network. The PLC node includes a receiver configured to receive frames having a frame segment identifier, an encrypted payload segment, and a message integrity code. A processor in the node is configured to create a local segment identifier for each frame using the message integrity code and an authentication key shared with an originating PLC node. The node rejects the frame, if the local segment identifier does not matches the frame segment identifier.

The processor extracts the encrypted payload segment for further processing, if the local segment identifier matches the frame segment identifier. The processor may combine the encrypted payload segment with one or more other encrypted payload segments to create a received payload. The received payload is then decrypted to create a decrypted payload.

BRIEF DESCRIPTION OF THE DRAWINGS

Having thus described the invention in general terms, reference will now be made to the accompanying drawings, wherein;

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Figure 1:
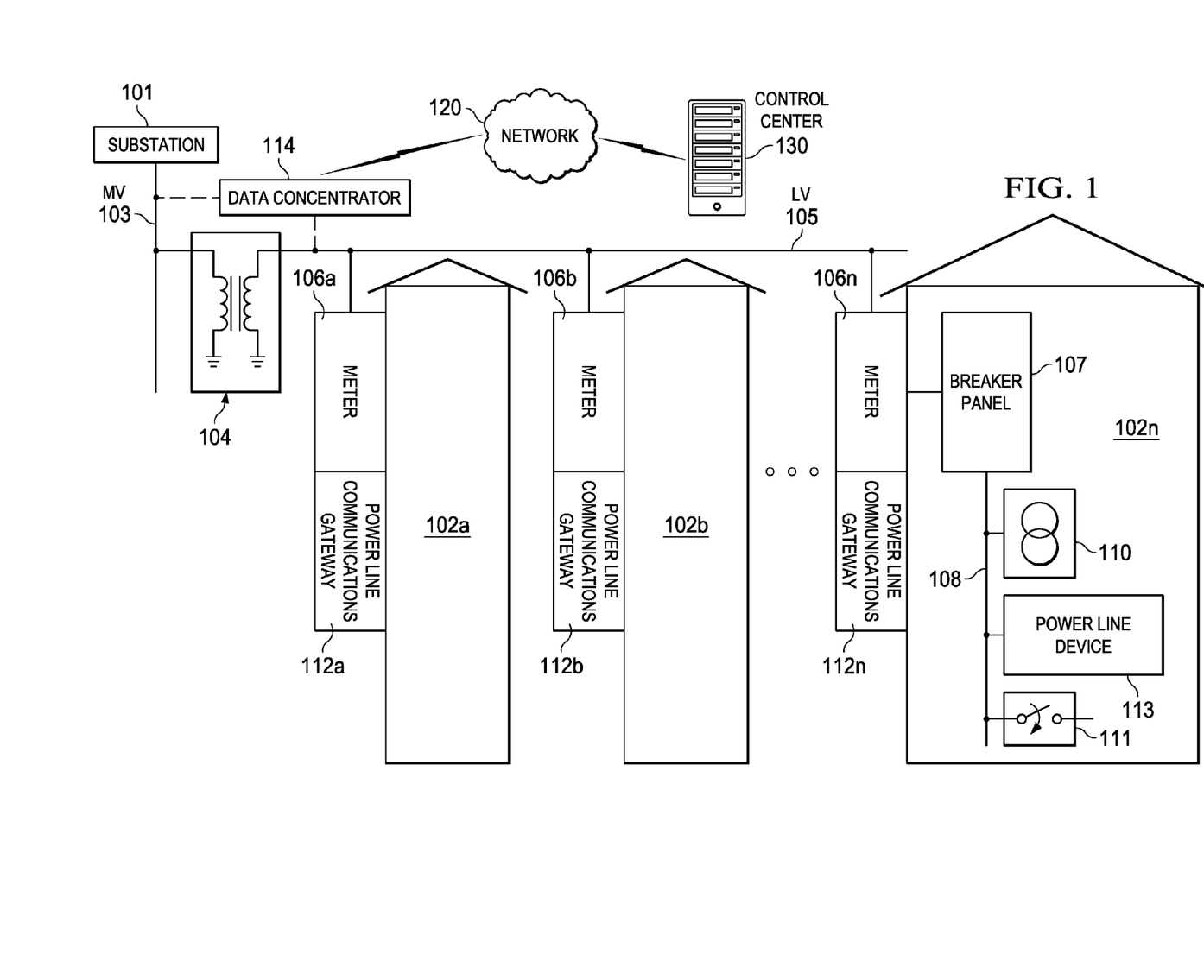
FIG. 1 is a diagram of a PLC system according to some embodiments.

FIG. 1 illustrates a power line communication network according to some embodiments. Medium voltage (MV) power lines 103 from subnode 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters or nodes 106a-n, which are typically mounted on the outside of residences 102a-n. Although referred to as "residences," premises 102a-n may include any type of building, facility, electric vehicle charging node, or other location where electric power is received and/or consumed. A breaker panel, such as panel 107, provides an interface between meter 105n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use a carrier signal having a frequency different from that of the power signal. The carrier signal may be modulated by the data, for example, using an OFDM technology or the like described, for example, G3-PLC standard.

PLC modems or gateways 112a-n at residences 102a-n use the MV/LV power grid to carry data signals to and from PLC data concentrator or router 114 without requiring additional wiring. Data concentrator or router 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances, An example of an AC or DC charger is illustrated as PLC device 113. Outside the premises, power line communication networks may provide street lighting control and remote power meter data collection.

One or more PLC data concentrators or routers 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateways) 112 and/or device(s) 113 through concentrators) 114.

Figures 2, 3:
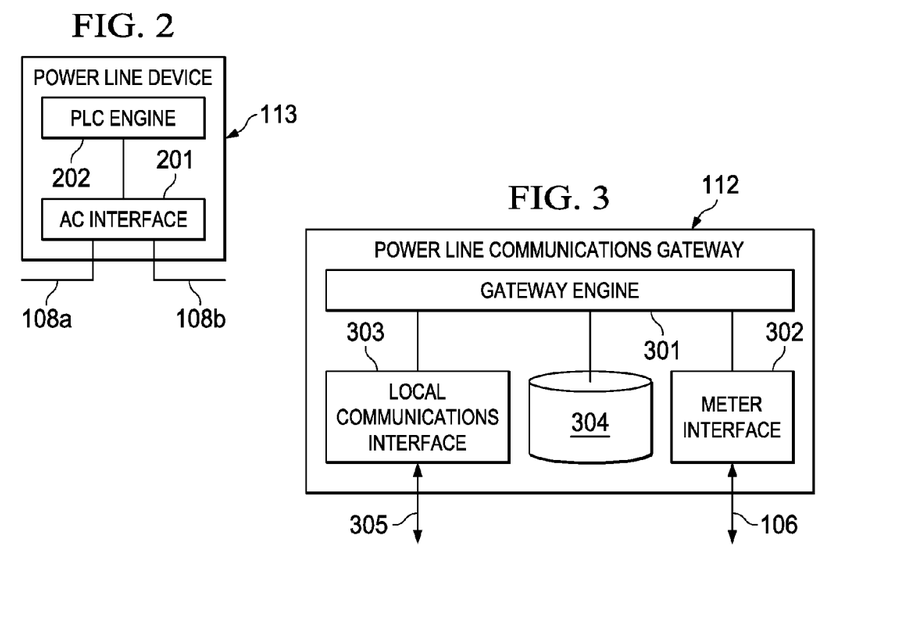
FIG. 2 is a block diagram of a PLC device or modem according to some embodiments.
FIG. 3 is a block diagram of a PLC gateway according to some embodiments.

FIG. 2 is a block diagram of PLC device 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. In some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data aggregators 114, etc.) for further processing. Conversely, PLC engine 202 may receive instructions and/or other information from such higher-level PLC devices encoded in PLC signals, for example, to allow PLC engine 202 to select a particular frequency band in which to operate.

FIG. 3 is a block diagram of PLC gateway 112 according to some embodiments. As illustrated in this example, gateway engine 301 is coupled to meter interface 302, local communication interface 304, and frequency band usage database 304. Meter interface 302 is coupled to meter 106, and local communication interface 304 is coupled to one or more of a variety of PLC devices such as, for example, PLC device 113. Local communication interface 304 may provide a variety of communication protocols such as, for example, ZigBee, Bluetooth, Wi-Fi, Wi-Max, Ethernet, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc), application profile, device class, and/or currently allocated frequency band. As such, gateway engine 301 may use database 305 in assigning, allocating, or otherwise managing frequency bands assigned to its various PLC devices.

Figure 4:
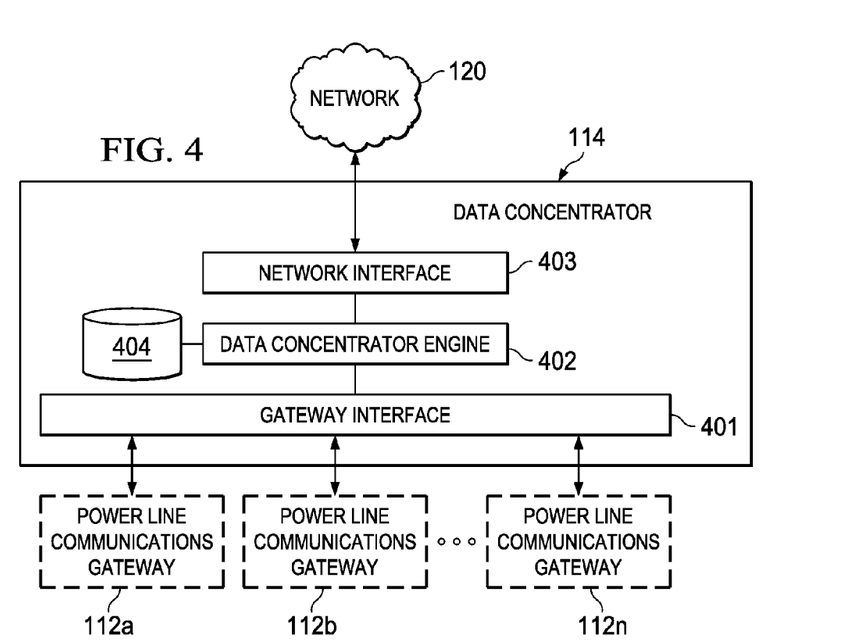
FIG. 4 is a block diagram of a PLC data concentrator according to some embodiments.

FIG. 4 is a block diagram of PLC data concentrator or router 114 according to some embodiments. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (now shown) configured to communicate directly with meters 116a-n, PLC devices 113, and/or other appliances. Further, if PLC gateways 112a-n are absent, frequency usage database 404 may be configured to store records similar to those described above with respect to database 304.

Figure 5:
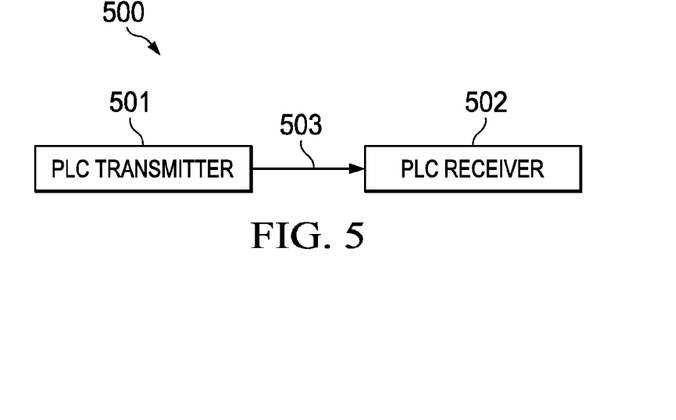
FIG. 5 is a schematic block diagram illustrating one embodiment of a system configured for point-to-point PLC.

FIG. 5 is a schematic block diagram illustrating one embodiment of a system 500 configured for point-to-point PLC. The system 500 may include a PLC transmitter 501 and a PLC receiver 502. For example, a PLC gateway 112 may be configured as the PLC transmitter 501 and a PLC device 113 may be configured as the PLC receiver 502. Alternatively, the PLC device 113 may be configured as the PLC transmitter 501 and the PLC gateway 112 may be configured as the PLC receiver 502. In still a further embodiment, the data concentrator 114 may be configured as either the PLC transmitter 501 or the PLC receiver 502 and configured in combination with a PLC gateway 112 or a PLC device 113 in a point-to-point system 500. In still a further embodiment, a plurality of PLC devices 113 may be configured to communicate directly in a point-to-point PLC system 500 as described in FIG. 5. Additionally, the subnode 101 may be configured in a point-to-point system 500 as described above. On of ordinary skill in the art will recognize a variety of suitable configurations for the point-to-point PLC system 500 described in FIG. 5.

Figure 6:
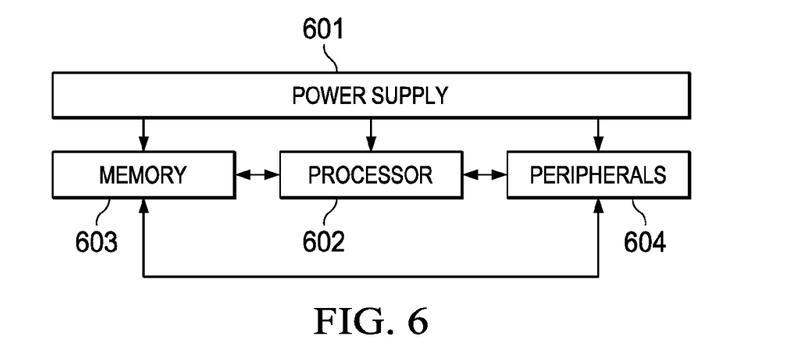
FIG. 6 is a block diagram of an integrated circuit according to some embodiments.

FIG. 6 is a block diagram of a circuit for implementing the transmission of multiple beacon frames using different modulation techniques on each tone mask in a PLC network according to some embodiments. In some cases, one or more of the devices and/or apparatuses shown in FIGS. 1-5 may be implemented as shown in FIG. 6. In some embodiments, processor 602 may be a digital signal processor (DSP), an application specific integrated circuit (ASIC), a system-on-chip (SoC) circuit, a field-programmable gate array (FPGA), a microprocessor, a microcontroller, or the like. Processor 602 is coupled to one or more peripherals 604 and external memory 603. In some cases, external memory 603 may be used to store and/or maintain databases 304 and/or 404 shown in FIGS. 3 and 4. Further, processor 602 may include a driver for communicating signals to external memory 603 and another driver for communicating signals to peripherals 604. Power supply 601 provides supply voltages to processor 602 as well as one or more supply voltages to memory 603 and/or peripherals 604. In some embodiments, more than one instance of processor 602 may be included (and more than one external memory 603 may be included as well).

Peripherals 604 may include any desired circuitry, depending on the type of PLC system. For example, in an embodiment, peripherals 604 may implement local communication interface 303 and include devices for various types of wireless communication, such as Wi-Fi, ZigBee, Bluetooth, cellular, global positioning system, etc. Peripherals 604 may also include additional storage, including RAM storage, solid-state storage, or disk storage. In some cases, peripherals 604 may include user interface devices such as a display screen, including touch display screens or multi-touch display screens, keyboard or other input devices, microphones, speakers, etc.

External memory 603 may include any type of memory. For example, external memory 603 may include SRAM, nonvolatile RAM (NVRAM, such as "flash" memory), and/or dynamic RAM (DRAM) such as synchronous DRAM (SDRAM), double data rate (DDR, DDR2, DDR3, etc) SDRAM, DRAM, etc, External memory 603 may include one or more memory modules to which the memory devices are mounted, such as single inline memory modules (SIMMs), dual inline memory modules (DIMMs), etc.

Figure 7:
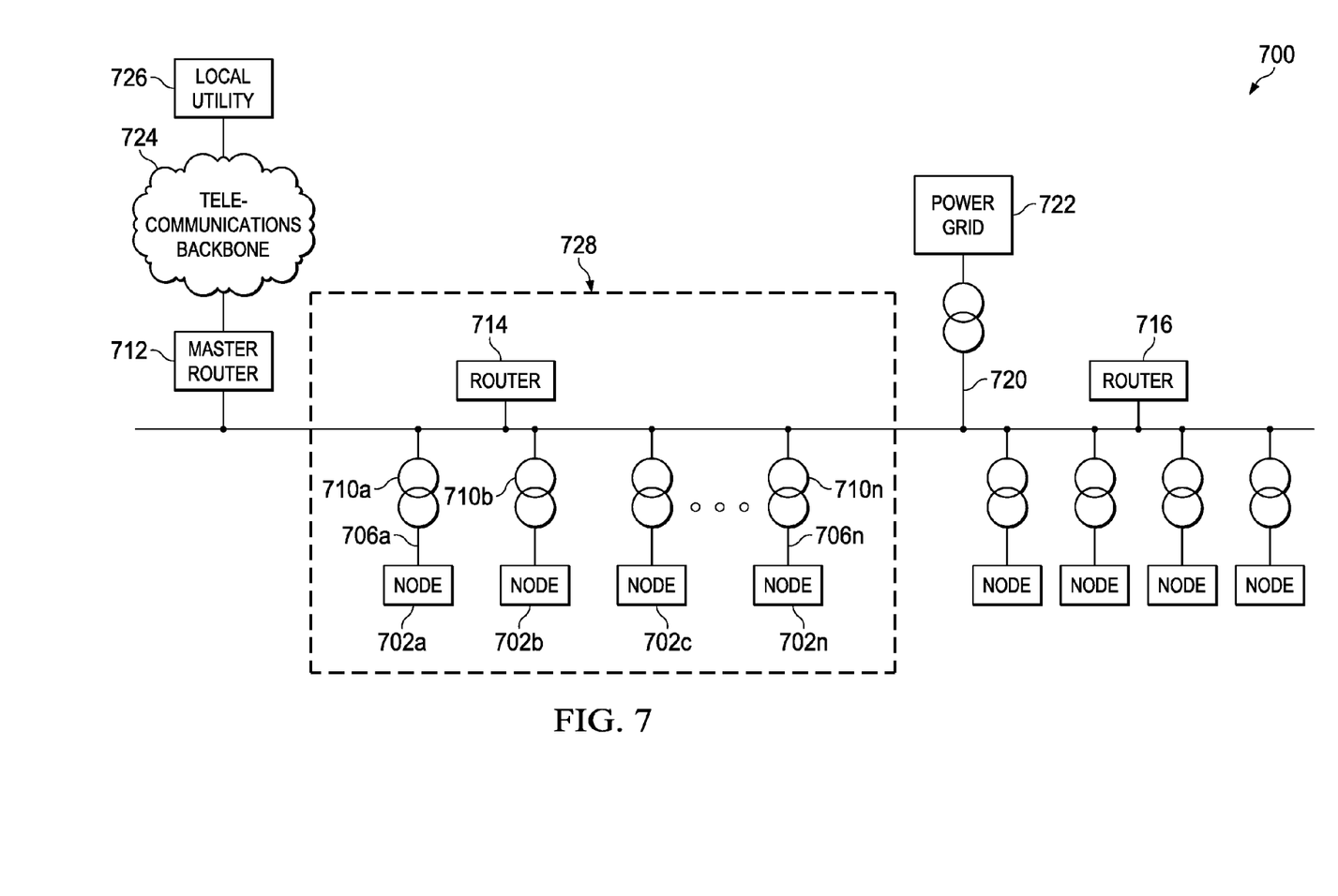
FIG. 7 illustrates an example embodiment of a PLC network for a local utility PLC communications system.

FIG. 7 illustrates an example embodiment of a PLC network 700 for a local utility PLC communications system, Network 700 includes LV nodes 702a-n and each of the nodes 702a-n is connected to MV power line 720 through a corresponding transformer 710a-n and LV line 706a-n. Router, or modem, 714 is also connected to MV power line 720. A sub-network 728, or neighborhood 728, may be represented by the combination of nodes 702a-n and router 714. Master router 712 and router 716 are also connected to MV line 720, which is powered by power grid 722. Power grid 722 represents the high voltage power distribution system.

Master router 712 may be the gateway to telecommunications backbone 724 and local utility, or control center, 726. Master router 712 may transmit data collected by the routers to the local utility 726 and may also broadcast commands from local utility 726 to the rest of the network. The commands from local utility 726 may require data collection at prescribed times, changes to communication protocols, and other software or communication updates.

During UL communications, the nodes 702*a-n* in neighborhood 728 may transmit usage and load information ("data") through their respective transformer 710*a-n* to the MV router 714. In turn, router 714 forwards this data to master router 712, which sends the data to the utility company 726 over the telecommunications backbone 724. During DL communications (router 714 to nodes 702*a-n*) requests for data uploading or commands to perform other tasks are transmitted.

When the MAC payload is encrypted first and segmented second, an unencrypted MHR is added to the encrypted payload. This can lead to potential security issues because a malicious node may capture the MHR and inject a malicious or "fake" segment. A receiver will not be able to detect that a malicious or fake segment was received until the receiver has reassembled and decrypted the encrypted payloads.

Figure 8:
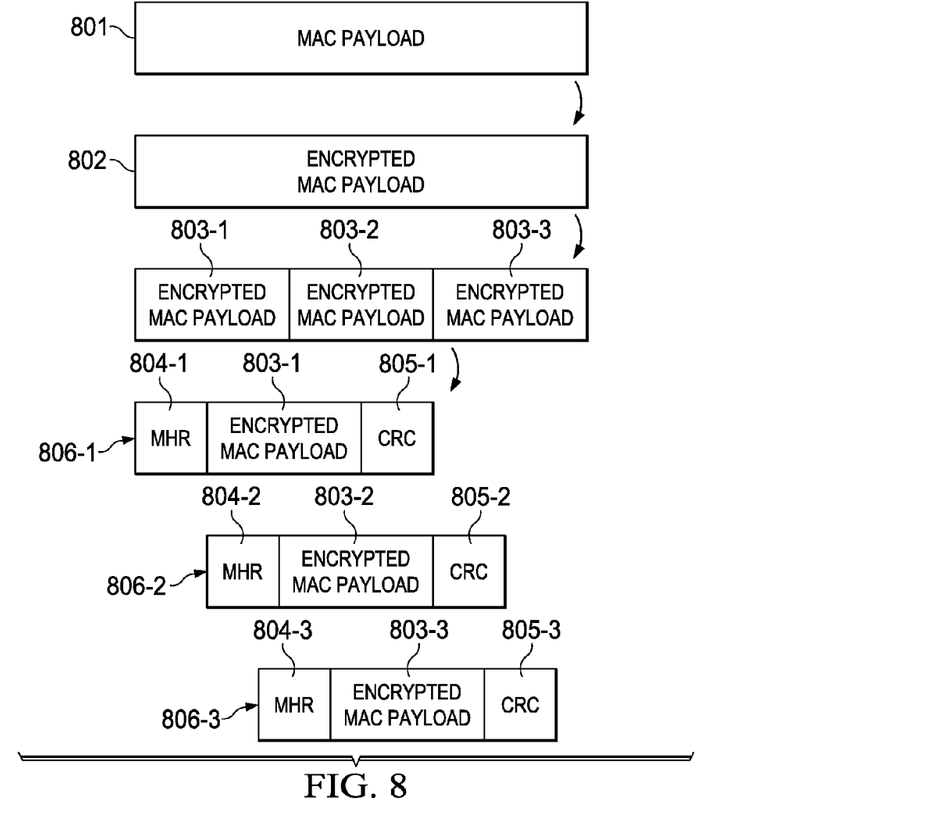
FIG. 8 illustrates the encryption and segmentation of a MAC payload that a transmitter intends to send to a receiver.

For example, FIG. 8 illustrates the encryption and segmentation of a MAC payload that a transmitter intends to send to a receiver. MAC Payload 801 is encrypted by the transmitter to create Encrypted MAC Payload 802, which is then segmented into three Encrypted MAC Payload segments 803. MHR 804 and CRC 805 are added to each segment 803 to create frames 806. The transmitter then sends the three frames 806 to the receiver.

Figure 9:
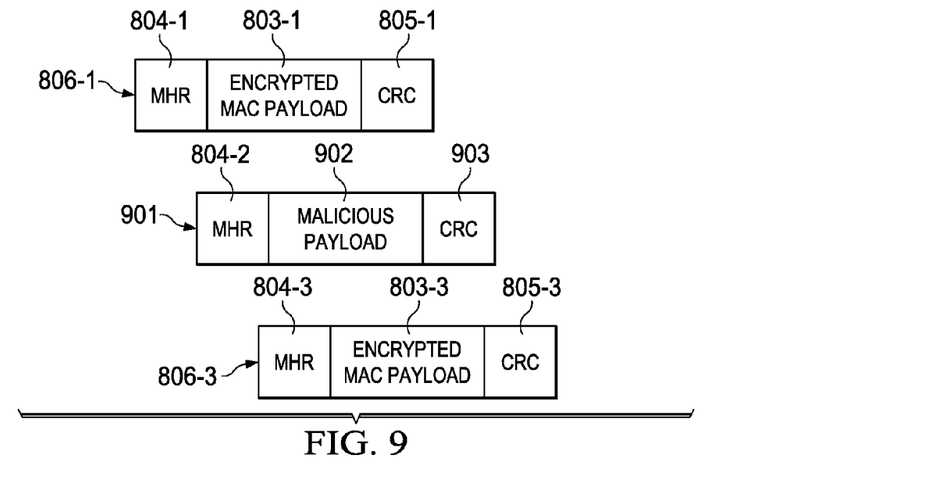
FIG. 9 illustrates a malicious segment frame that has been transmitted in place of an original segment.

However, as illustrated in FIG. 9, a malicious device could be listening to segments 806 and could potentially send a malicious segment 901 in place of original second segment 806-2. This malicious frame 901 is possible because MHR 806-2 is unencrypted. The malicious device can recreate the correct MHR 806-2 and insert malicious or "fake" data as payload 902. CRC 903 is appended to the malicious frame, which is then sent to the receiver. The intended receiver will not be able to detect malicious payload 902 and will continue with the reassembly procedure using payloads 803-1, 902, and 803-3.

After reassembly of the segments, the receiver starts the decryption process and only then will detect that the frame is corrupted. However, even when the receiver detects the corrupted frame, it will not know which segment(s) contained the errors. The problem is of serious concern to the system because the transmitter will not know that the event has occurred, but would instead consider that all segments were transmitted successfully.

The cause of this security threat is the fact that the receiver is unable to detect a malicious segment without performing a decryption process. In order to avoid such scenarios, the systems and methods proposed herein introduce a segment identifier into every segment. The segment identifier field may be, for example, an asymmetric function of an authentication key and the CRC of the frame. The segment identifier may have a smaller size than the CRC or message integrity code (MIC). In one embodiment, the segment identifier size is two bytes.

Given that the authentication key is known only to trusted nodes and the CRC is unique per frame, a malicious transmitter will not be able to recreate the same segment identifier. Even, if the malicious transmitter knows the algorithm used to create the segment identifier, it will not know the authentication key that is needed to create the segment identifier.

To ensure the security of this feature, the algorithm used to generate the segment identifier should be asymmetric such that the authentication key cannot be obtained using just the CRC and the segment identifier.

Upon receiving a segment, a receiver will compute a local segment value using the authentication key and the segment CRC. The receiver compares the local segment value to the segment identifier in each segment and will drop any segments with a segment identifier that does not match the locally computed value.

Because the CRC changes per frame, this variation helps to prevent replay attacks by a malicious transmitter. Also, although the segment identifier is sent unencrypted, a malicious transmitter will not be able to create malicious frames, because the CRC of the malicious payload cannot be made to match the CRC used to create the segment identifier and because it will not have the Key used to create the segment identifier.

Figure 10:
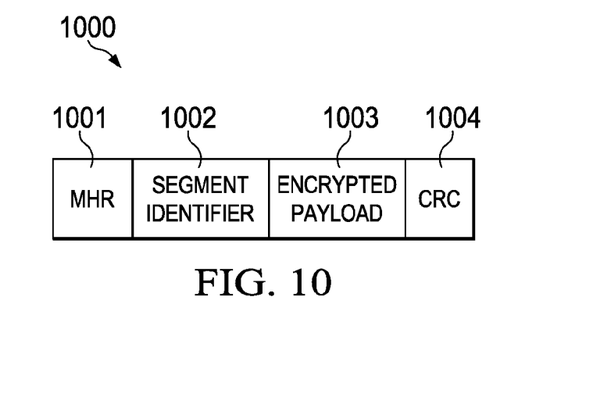
FIG. 10 illustrates the use of a segment identifier according to one embodiment.

FIG. 10 illustrates the use of a segment identifier according to one embodiment. Frame 1000 is generated by a transmitter and comprises header 1001, segment identifier 1002, encrypted payload 1003, and CRC 1004. Header 1001 includes, for example, routing information from the transmitter to an intended receiver. Encrypted payload is a segment of data being sent from the transmitter to the receiver that has been extracted from a larger data frame and encrypted, CRC 1004 is a message integrity check for the header 1001 and payload 1003. Using the CRC 1004 and an authentication key known to the transmitter and intended receiver, the transmitter generates segment identifier 1002 using an algorithm also known to the transmitter and intended receiver. The frame 1000 is then sent to the intended receiver.

In one embodiment, the mechanism used to create the segment identifier is the MD5 message-digest algorithm as defined in RFC 1321. The input to the MD5 algorithm is a 128-bit authentication key concatenated with a 16-bit CRC. The MD5 algorithm generates a 128 bit output. The first 16 bytes of the 128 bit MD5 output may be used as the segment identifier. It will be understood that any other algorithm may be used to generate a segment identifier using an authentication key and frame information (e.g., the CRC). All or part of the CRC (e.g., 16 bits or some other portion of the CRC) may be used to generate the segment identifier. Additionally, the segment identifier may have any appropriate length, such as 16 bits or another number of bits.

Figure 11:
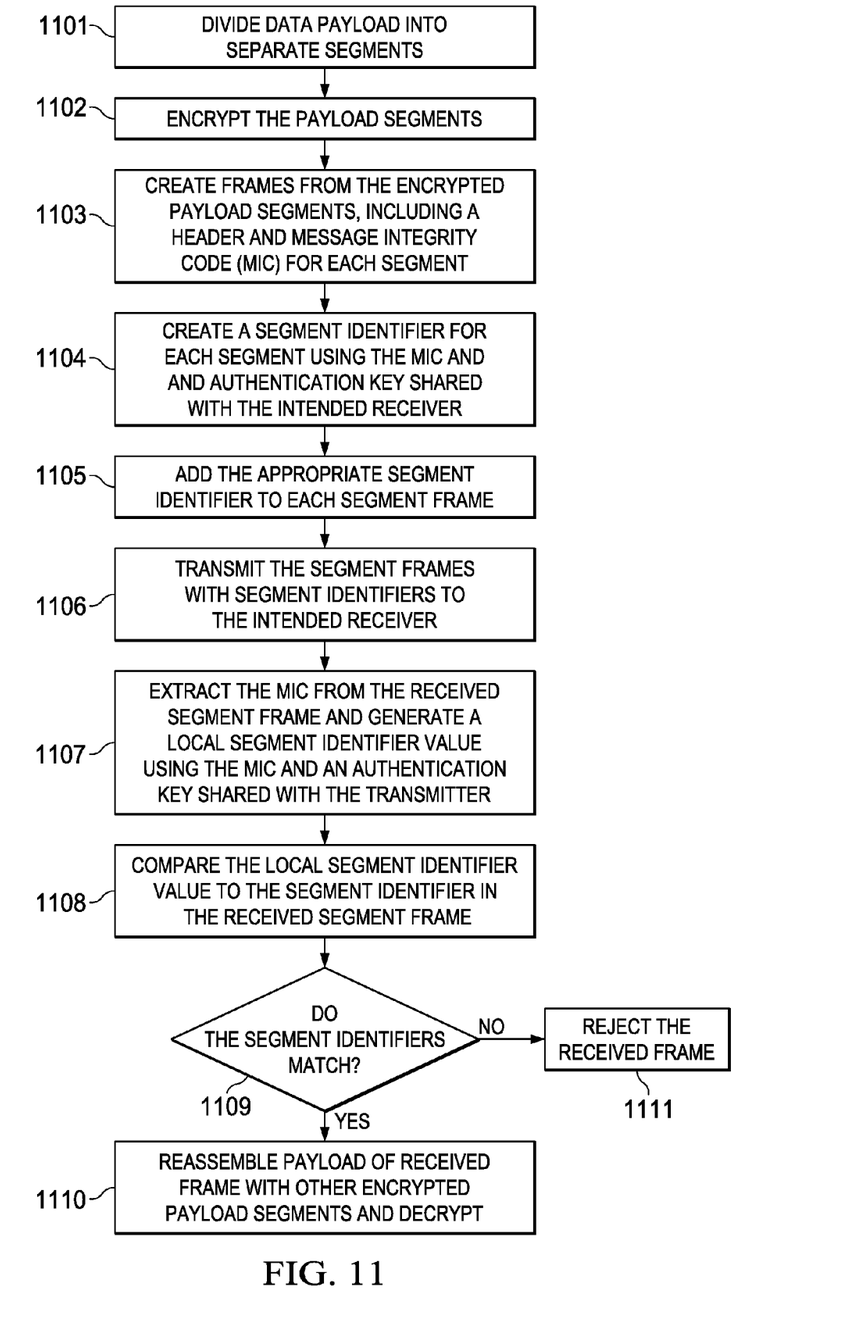
FIG. 11 is a flowchart illustrating a process for transmitting segmented, encrypted frames with security identifiers.

FIG. 11 is a flowchart illustrating a process for transmitting segmented, encrypted frames with security identifiers. In step 1101, a data payload is divided into a plurality of separate segments by a transmitter. The number of segments may be selected based upon a maximum frame size or a maximum payload size, for example. In step 1102, the payload segments are encrypted by the transmitter using an encryption algorithm known to the transmitter and an intended receiver. In step 1103, frames are created for each of the encrypted payload segments. The frames include header and a MIC, such as a 16-bit CRC.

In step 1104, a segment identifier is created for each segment using the MIC and an authentication key shared with the intended receiver. In one embodiment, a 128 bit authentication key is used along with the CRC to generate the segment identifier using the MD5 algorithm. In step 1105, the segment identifier is added to each segment frame. The frames are then transmitted to the intended receiver in step 1106.

In step 1107, the receiver extracts the MIC (e.g., CRC) from the received segment frame and uses it along with the authentication key to generate a local segment identifier value. In step 1108, the local segment identifier value is compared to the unencrypted segment identifier of the received frame. In step 1109, the receiver determines whether the segment identifiers match. If the segment identifier value calculated by the receiver in step 107 matches the segment identifier extracted from the received frame, then the encrypted payload of the received frame is reassembled with other encrypted payload segments and then decrypted in step 1110. Otherwise, if the segment identifiers do not match, then the received frame is rejected in step 1111.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed Although specific terms are employed herein, they are used in a generic and descriptive sense only and not for purposes of limitation.

What is claimed is:

1. A method for verifying frames in a power line communication (PLC) network, comprising:
   receiving a frame at a PLC network hardware node, the frame comprising a frame segment identifier, an encrypted payload segment, and a message integrity code;
   creating a local segment identifier for each frame using the message integrity code and an authentication key shared with an originating PLC hardware node;
   extracting the encrypted payload segment for further processing, if the local segment identifier matches the frame segment identifier; and
   rejecting the frame, if the local segment identifier does not matches the frame segment identifier.

2. The method of claim 1, further comprising:
   combining the encrypted payload segment with one or more other encrypted payload segments to create a received payload; and
   decrypting the received payload to create a decrypted payload.

3. The method of claim 1, further comprising creating the local segment identifier using an MD5 algorithm.

4. The method of claim 3, the method further comprising:
   concatenating the authentication key and the message integrity code to create an input value;
   generating a MD5 algorithm output value from the input value; and
   creating the local segment identifier from output value.

5. The method of claim 4, wherein the authentication key is a 128-bit key, the message integrity code is a 16-bit cyclic redundancy check (CRC) value, and the first 16-bits of the output value are used to create the local segment identifier.

6. A device for processing frames received from nodes in a power line communication (PLC) network, comprising:
   a receiver configured to:
      receive a frame comprising a frame segment identifier, an encrypted payload segment, and a message integrity code; and
   a processor configure to:
      create a local segment identifier for each frame using the message integrity code and an authentication key shared with an originating PLC node;
      extract the encrypted payload segment for further processing, if the local segment identifier matches the frame segment identifier; and
      reject the frame, if the local segment identifier does not matches the frame segment identifier.

7. The device of claim 6, the processor further configured to:
   combine the encrypted payload segment with one or more other encrypted payload segments to create a received payload; and
   decrypt the received payload to create a decrypted payload.

8. The method of claim 6, the processor further configured to create the local segment identifier using an MD5 algorithm.

9. The method of claim 8, the processor further configured to:
   combine the authentication key and the message integrity code to create an input value;
   generate a MD5 algorithm output value from the input value; and
   create the local segment identifier from output value.

10. The method of claim 9, wherein the authentication key is a 128-bit key, the message integrity code is a 16-bit cyclic redundancy check (CRC) value, and the first 16-bits of the output value are used to create the local segment identifier.

* * * * *